Aug. 4, 1964  A. F. N. LINDSJO ETAL  3,143,284
RESILIENT MOUNTING FOR MOTOR-FAN UNIT
Filed April 5, 1961  2 Sheets-Sheet 1

INVENTORS
Anders Folke Napoleon Lindsjö
BY Jean Ivan Ragnar Boivie
ATTORNEY

Aug. 4, 1964   A. F. N. LINDSJO ETAL   3,143,284
RESILIENT MOUNTING FOR MOTOR-FAN UNIT
Filed April 5, 1961   2 Sheets-Sheet 2

INVENTORS
ATTORNEY

United States Patent Office 3,143,284
Patented Aug. 4, 1964

3,143,284
RESILIENT MOUNTING FOR MOTOR-FAN UNIT
Anders Folke Napoleon Lindsjo and Jean Ivan Ragnar Boivie, Stockholm, Sweden, assignors to Aktiebolaget Electrolux, Stockholm, Sweden, a corporation of Sweden
Filed Apr. 5, 1961, Ser. No. 100,926
8 Claims. (Cl. 230—235)

This invention relates to apparatus for resiliently mounting a motor-fan unit in a casing.

It is a common practice to use resilient mountings to suspend rotating parts in a stationary casing. The fan motors in present-day vacuum cleaners and ventilating units are usually operated at high speeds to conserve space. Further, in ventilating units it is extremely important to provide the smallest possible clearance between the casing and the peripheral edges of the fan blades.

One of the objects of this invention is to provide an improved apparatus for mounting a motor-fan unit in a casing.

Another object is to provide a resilient rubber mounting for suspending a motor-fan unit in a casing which permits relatively great tangential movements of the unit in the casing but relatively small movements in both axial and radial directions.

Further objects and advantages of our invention will become apparent as the following description proceeds, and the features of novelty which characterize the invention will be pointed out with particularity in the claims annexed to and forming a part of this specification.

For a better understanding of our invention, reference may be had to the following description taken in connection with the accompanying drawings, in which:

FIGS. 7 to 9b are fragmentary views, partly or entirely in section, of resilient mounts of the kind seen in FIGS. 2 and 6 illustrating other embodiments of the invention;

FIG. 10 is a sectional view taken at line 10—10 of FIG. 11 illustrating another embodiment of the invention.

Figure 1:
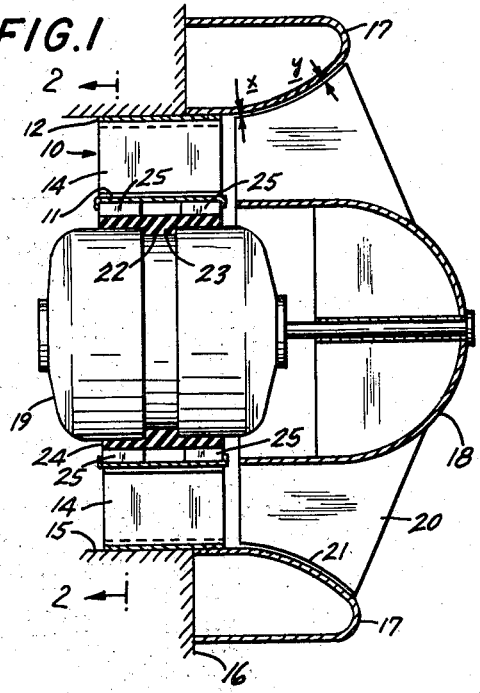
FIG. 1 is a vertical sectional view of a motor-driven ventilating fan illustrating the motor mounting incorporating the invention.

Referring to FIG. 1 of the drawings, the invention is shown applied to a room ventilating unit having an annular housing 10 formed by an inner cylindrical casing 11 and an outer annular member 12, the casing 11 being supported within the annular member 12 by radially disposed walls 14. The housing 10 is mounted in any suitable manner in an opening or duct 15 of a wall 16.

The casing 11 and an outwardly flaring hollow tubular part or guide 17, which is fixed to one side of wall 16 in any suitable manner, defines an air passageway within which is centrally disposed a fan 18 fixed to a shaft of an electric motor 19. The fan 18 is formed with blades 20 whose outer edges 21 have the same configuration in an axial direction as the outwardly flared tubular part or guide 17. In order for the fan 18 to operate efficiently, the gap between the outer peripheral edges 21 of the blades 20 and inner surface of the hollow tubular part 17 desirably should be as small as possible in both radial and axial directions. By way of example, the clearance at the regions x and y in the ventilating unit of FIG. 1 desirably should be about 2 mm.

Motor 19 is provided with an annular groove 22 which receives an inwardly extending ridge 23 of an annular resilient member 24 which is disposed about and snugly fits on the motor 19. The motor 19 is resiliently carried within the cylindrical casing 11 by the resilient member 24 which may be formed of an elastomeric material like natural or synthetic rubber or other rubber-like plastics. Thus, the term "rubber" as hereinafter used in the specification is intended to include other rubber-like plastics.

Figure 2:
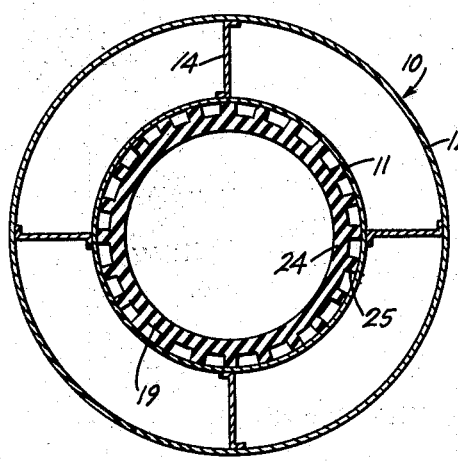
FIG. 2 is a sectional view taken at line 2—2 of FIG. 1 to illustrate details more clearly.
Figure 3:
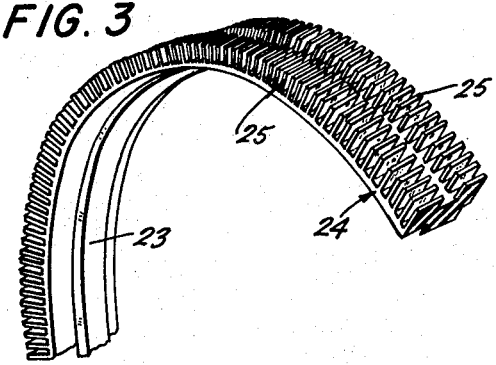
FIG. 3 is a fragmentary perspective view of the form of resilient mount shown in FIGS. 1 and 2.
Figure 4:
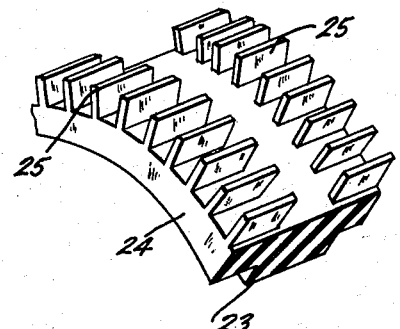
FIG. 4 is an enlarged fragmentary perspective view of the resilient mount shown in FIG. 3.

In accordance with our invention, the annular resilient member 24 is of comb-like form having two rows of closely spaced teeth 25, as best seen in FIGS. 3 and 4. As shown in FIGS. 1 and 2, the teeth 25 project radially outward from the motor 19 and at their outer ends frictionally grip the cylindrical casing 11 only at the inner curved peripheral surface thereof and otherwise are free and unconstrained. As best shown in FIG. 4, the radial distance of the projections or blades 25 between the motor 19 and the casing 11 is greater than the thickness of the blades, that is, the distance between the opposing axially extending faces of the teeth or blades.

Figure 5:
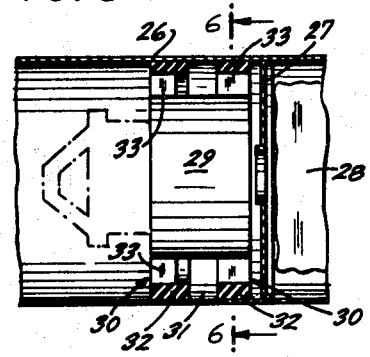
FIG. 5 is a fragmentary vertical sectional view of a horizontal tank-type vacuum cleaner to show a motor mounting incorporating another embodiment of the invention.
Figure 6:
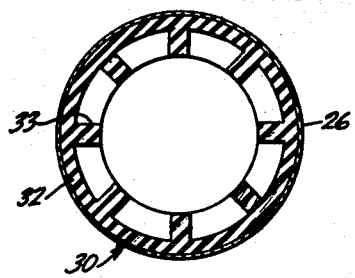
FIG. 6 is a sectional view taken at line 6—6 of FIG. 5.

In FIGS. 5 and 6 of the drawings another embodiment of the invention is shown applied to a horizontal tank-type vacuum cleaner which includes a casing 26 having an apertured wall 27 to provide two compartments, in one of which a dust bag 28 is disposed and in the other of which a motor-fan unit 29 is mounted. The motor-fan unit 29 is resiliently mounted in the casing 26 by two resilient members 30 of annular form having a gap 31 therebetween. Each resilient member 30 includes an outer ring-shaped part 32 which fits snugly within the inner surface of the casing 26. Teeth 33 project radially inward from the ring-shaped part 32 and at their inner ends frictionally grip the motor part of the motor-fan unit 29 only at the curved peripheral surface thereof and otherwise are free and unconstrained.

Figure 7:
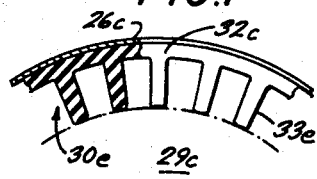

FIG. 7 illustrates another form of resilient mount 30e for resiliently supporting the motor 29c of a motor-fan unit similar to the one shown in FIG. 5. In FIG. 7 the resilient mount 30e comprises an outer ring-shaped part 32c which is disposed within the casing 26c and snugly fits therein. The mount 30e is of comb-like form and provided with a plurality of spaced teeth 33e which extend radially inward from the ring-shaped part 32c and are like the teeth 25 illustrated in FIG. 4. The extreme inner ends of the teeth 33e frictionally grip the motor 29c only at the curved peripheral surface thereof and otherwise are free and unconstrained.

Figure 8:
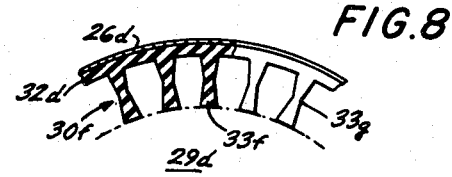

FIG. 8 illustrates a further form of resilient mount 30f which includes an outer ring-shaped part 32d snugly fitting within casing 26d and teeth 33f extending radially inward therefrom. The inner ends of the teeth 33f frictionally grip the motor 29d only at the curved peripheral surface thereof and otherwise are free and unconstrained. In FIG. 8 the teeth 33f are thicker at their inner and outer ends than at regions 33g therebetween.

Figures 9A, 9B, 10:
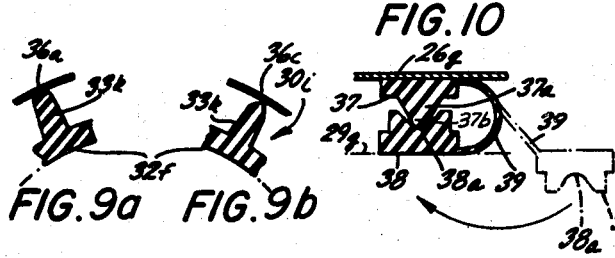

In FIGS. 9a and 9b the resilient mount 30i includes an inner ring-shaped part 32f disposed about the motor and spaced teeth 33k which extend radially outward therefrom and are of the general shape of the teeth 25 in FIG. 4. In FIGS. 9a and 9b the teeth 33k are tapered from their inner to their outer ends and may be of convex or pointed form at their outer ends, as indicated at 36a and 36c, respectively.

Figure 11:
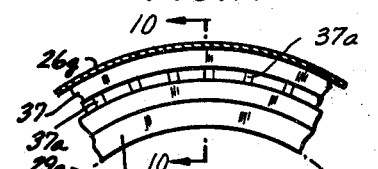
FIG. 11 is a fragmentary end elevation of the resilient mount shown in FIG. 10.

FIGS. 10 and 11 illustrate a form of resilient mount which includes outer and inner ring-shaped parts 37 and 38 which are connected by a relatively thin web 39. The outer part 37 fits snugly within the casing 26g and includes spaced teeth 37a which extend radially inward and are formed with pointed inner ends 37a which snugly fit in a groove 38a formed in the inner part 38 disposed about the motor 29g.

In view of the foregoing, it will now be understood that an improved resilient mount for suspending a motor-fan unit in a casing has been provided which permits great tangential movements of the unit in the casing but relatively small movements in both axial and radial directions. In the different forms of the invention illustrated and described above, at least eight teeth desirably should be provided about the motor-fan unit and equally spaced about its periphery and the casing. The dimensions of the teeth, that is, their height compared to their thickness or width angularly about the axis of the unit, desirably are related in such a manner that the extremities of the teeth flex when subjected to tangential load, as during starting of the motor, for example. The resilient ring-shaped part formed with the spaced teeth preferably is pre-stressed slightly when positioned between the casing and the motor-fan unit. However, the initial pre-stressing of the ring-shaped resilient part is not of such great magnitude that the teeth are flexed when not subjected to tangential load. Further, the spaced teeth are not so thin that they will assume the shape of the letter S between the motor-fan unit and the casing when the motor is being operated.

The improved resilient mount in accord with our invention possesses the advantage that it can be readily mounted between the motor-fan unit and the casing. When the ring-shaped part formed with teeth is initially positioned about the motor shell, it is turned in one direction about the axis of the motor to cause all of the teeth to flex in the same direction. When the ring-shaped part is subsequently adjusted to its final position, it is turned slightly in the opposite direction about the axis of the motor to cause the teeth to assume an erect or radial position in the manner illustrated in the drawing and described above.

In view of the foregoing, it will now be understood that we have provided a ring-shaped structure which, as seen in FIGS. 1 to 4, includes a circular portion 24 of resilient elastomeric material mounted on the motor 19 and at least eight projections or blades 25 distributed about and flexible with respect to the circular portion 24. The projections or blades 25 extend axially of the motor 19 and cylindrical casing 11 and radially across a gap from the motor to a curved peripheral surface of the casing, the axial extent of the projections or teeth 25 between the motor and the cylindrical casing being greater than their radial extent therebetween. As best shown in FIG. 4, the distance between opposing axially extending faces of the projections or blades 25 is substantially less than their radial distance. The projections 25 are in frictional engagement with the cylindrical casing 11 only at the inner curved peripheral surface thereof and otherwise are free and unconstrained.

The ring-shaped structure formed by the circular portion 24 and blades 25 is so constructed and formed that when the motor-fan unit is in equilibrium, it is pre-stressed and the projections 25 and circular portion 24 are in first positions relative to one another. Under such equilibrium conditions of the motor-fan unit, the projections or blades 25 are not distorted and remain substantially unflexed.

When the motor-fan unit is subjected to torque and becomes unbalanced, as during starting of the motor, for example, the blades 25 and the circular portion 24 flex from their first relative positions to second positions relative to one another. Under these conditions, the blades 25 become distorted and flex to enable the motor-fan unit to twist about the axis of rotation of the fan 18 without significant movement in an axial direction lengthwise of and in a radial direction transverse to the axis of rotation of the fan 18.

What is claimed is:

1. In apparatus of the class described, the combination of a first member providing a casing, a second member comprising a unit having a driven rotatable element, said members having a gap therebetween when said second member is supported within said first member, and means for supporting said second member within said first member, said supporting means comprising ring-shaped structure which includes a circular portion of resilient elastomeric material mounted on one of said members and at least eight projections distributed about and flexible with respect to said circular portion, said projections extending axially of said members and radially across the gap from said one member to a curved peripheral surface of said other member, the radial distance of said projections between said members being greater than the thickness of said projections, said projections being in frictional engagement with said other member only at the curved peripheral surface thereof and otherwise free and unconstrained, and said ring-shaped structure being so constructed and formed that when said second member is in equilibrium it is pre-stressed and said projections and said circular portion are in first positions relative to one another, and when said second member is subjected to torque and is unbalanced said projections and said circular portion flex from the first relative positions to second relative positions to enable said second member to twist about the axis of rotation of said driven element without significant movement in an axial direction lengthwise of and in a radial direction transverse to the axis of rotation of said driven element.

2. Apparatus as set forth in claim 1 in which said projections form a first group distributed about said circular portion, and a second group of at least eight projections similar to said projections in said first group, said projections in said second group being distributed about said circular portion and spaced axially of said driven element from said first group.

3. Apparatus as set forth in claim 1 in which said other member comprises a ring-shaped structure of resilient elastomeric material providing said curved peripheral surface.

4. In apparatus of the class described, the combination of a first member providing a casing, a second member comprising a unit having a driven rotatable element, said members having a gap therebetween when said second member is supported within said first member, and means for supporting said second member within said first member, said supporting means comprising structure which includes an annular-shaped portion mounted on one of said members and at least eight spaced projections which are distributed about said portion and extend axially of said members and radially across the gap from said one member to a curved peripheral surface of said other member, the radial distance of said projections between said members being greater than the thickness of said projections, said projections being distortable and in frictional engagement with said other member only at the curved peripheral surface thereof and otherwise free and unconstrained, and said projections being so constructed and formed that when said second member is in equilibrium they are pre-stressed and substantially undistorted, and when said second member is subjected to torque and is unbalanced they become distorted to enable said second member to twist about the axis of rotation of said driven element without significant movement in an axial direction lengthwise of and in a radial direction transverse to the axis of rotation of said driven element.

5. In apparatus of the class described, the combination of a first member providing a casing, a second member comprising a unit having a driven rotatable element, said members having a gap therebetween when said second member is supported within said first member, and means for resiliently supporting said second member within said first member, said supporting means comprising structure which includes an annular-shaped portion mounted on one of said members and at least eight spaced projections which are distributed about said portion and fixed thereto and extend axially of said members and radially across the gap from said one member to a curved peripheral surface of said other member, the radial distance of said projections between said members being greater than the thickness of said projections, said projections being flexible and in frictional engagement with said other member only at the curved peripheral surface thereof and otherwise free and unconstrained, and said structure being so constructed and formed that, when said second member is in equilibrium, it is pre-stressed and said projections are substantially unflexed, and when said second member is subjected to torque and is unbalanced, said projections flex to enable said second member to twist about the axis of rotation of said driven element without significant movement in an axial direction lengthwise of and in a radial direction transverse to the axis of rotation of said driven element.

6. In apparatus of the class described, the combination of a first member providing a casing, a second member comprising a unit having a driven rotatable element, said members having a gap therebetween when said second member is supported within said first member, and means for resiliently supporting said second member within said first member, said supporting means comprising structure which includes an annular-shaped portion mounted on one of said members and at least eight spaced projections formed of resilient elastomeric material which are distributed about said portion and fixed thereto and extend axially of said members and radially across the gap from said one member to a curved peripheral surface of said other member, the radial distance of said projections between said members being greater than the thickness of said projections, said projections being flexible and in frictional engagement with said other member only at the curved peripheral surface thereof and otherwise being free and unconstrained, and said projections being so constructed and formed that when said second member is in equilibrium they are pre-stressed and substantially unflexed, and when said second member is subjected to torque and is unbalanced they flex to enable said second member to twist about the axis of rotation of said driven element without significant movement in an axial direction lengthwise of and in a radial direction transverse to the axis of rotation of said driven element.

7. In apparatus of the class described, the combination of a first member providing a casing, a second member comprising a unit having a driven rotatable element, said members having a gap therebetween when said second member is supported within said first member, and means for resiliently supporting said second member within said first member, said supporting means comprising a part of resilient elastomeric material which includes an annular-shaped portion mounted on one of said members and at least eight spaced projections which are distributed about said portion and formed integrally therewith and extend axially of said members and radially across the gap from said one member to a curved peripheral surface of said other member, the radial distance of said projections between said members being greater than the thickness of said projections, said projections being in frictional engagement with said other member only at the curved peripheral surface thereof and otherwise being free and unconstrained, and said projections being so constructed and formed that when said second member is in equilibrium they are pre-stressed and substantially unflexed, and when said second member is subjected to torque and is unbalanced they flex to enable said second member to twist about the axis of rotation of said driven element without significant movement in an axial direction lengthwise of and in a radial direction transverse to the axis of rotation of said driven element.

8. In apparatus of the class described, the combination of a first member providing a casing, a second member comprising a unit having a driven rotatable element, means for supporting said second member within said first member, said supporting means comprising concentrically disposed outer and inner rings of resilient elastomeric material mounted respectively on said first and second members, said rings having a gap therebetween when said second member is supported within said first member, at least eight spaced projections which are distributed about one of said rings and formed integrally therewith and extend axially of said members and radially across the gap to a curved peripheral surface of said other ring, the radial distance of said projections between said rings being greater than the thickness of said projections, said projections being in frictional engagement with said other ring only at the curved peripheral surface thereof and otherwise being free and unconstrained, and said one ring and said projections being so constructed and formed that when said second member is in equilibrium said projections are pre-stressed and substantially unflexed, and when said second member is subjected to torque and is unbalanced said projections flex to enable said second member to twist about the axis of rotation of said driven element without significant movement in an axial direction lengthwise of and in a radial direction transverse to the axis of rotation of said driven element.

References Cited in the file of this patent
UNITED STATES PATENTS

| 2,108,734 | Van Sciver | Feb. 15, 1938 |
| 2,749,024 | Wilfert | June 5, 1956 |
| 2,936,141 | Rapata | May 10, 1960 |

FOREIGN PATENTS

| 519,250 | Germany | Feb. 5, 1931 |